Patented Apr. 26, 1949

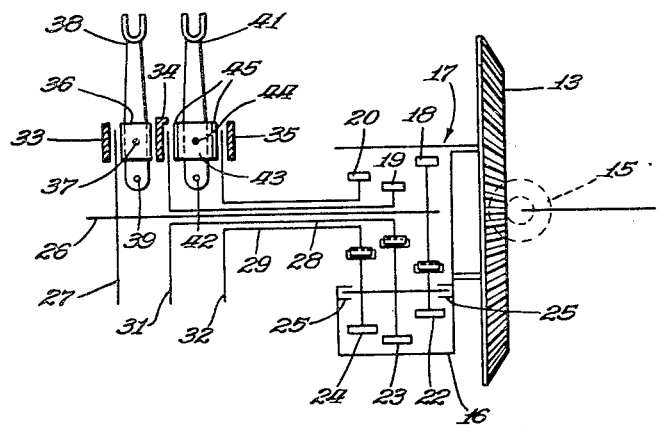

2,468,628

UNITED STATES PATENT OFFICE 2,468,628

HYDRAULIC CONTROL SYSTEM FOR STEERING-BY-DRIVING MECHANISM

William W. Henning, Riverside, Ill., assignor to International Harvester Company, a corporation of New Jersey Application May 9, 1947, Serial No. 746,961

16 Claims. (Cl. 180—9.2)

This invention concerns vehicles propelled and steered by laterally-spaced propelling units drivable by respective change-speed apparatuses at different rates of speed, and more particularly concerns control means for determining the speed at which the change-speed apparatuses cause said units to be driven.

An important object of the invention is the provision of a change-speed control for a steering-by-driving change-speed transmission wherein there are brakes individually engageable for determining respective speeds at which the transmission is adapted to drive its associated vehicle propelling means, together with novel means variously energizable for selectively engaging the brakes, and a member manipulatable for controlling energization of the variously energizable means.

A further object is the provision in a vehicle steering-by-driving apparatus capable of driving a drive shaft for propelling means at a side of the vehicle at different speeds according to selective engagement of change-speed control brakes and of a shaft brake for said drive shaft, of means normally maintaining one of the transmission brakes engaged, and means variously energizable to cause disengagement of the one brake and selective engagement of the other two brakes under manual control.

A further object is the provision of an improved hydraulic motor arrangement for controlling brakes of steering-by-driving apparatus which is operable to cause the driven element of such apparatus to operate at various speeds correlated with respective engagement of the brakes, and which apparatus includes a first brake chamber receivable of fluid under pressure to disengage a normally engaged brake and other chambers respectively receivable of fluid under pressure for causing selective engagement of the other two brakes during disengagement of the normally engaged brake; and the invention further contemplates the use of a pressure reducing device between a source of pressure and the last named two chambers to assure that the first transmission brake chamber will be supplied with fluid at sufficient pressure for holding the normally engaged brake disengaged during selective engagement of the other two brakes.

Another object of the invention concerns an arrangement wherein speed control brakes associated with a steering-by-driving transmission include coaxial axially-spaced brake disks brakeable by means of respectively associated fixed pressure plates and cooperating movable pressure shoes carried by brake operators pivoted about axes extending transversely of and between the axially spaced disks, and hydraulic motor means having telescopically adjustable rods extending in parallelism with the brake disks axes and respectively operably connected with the brake shoe operators.

The above and other desirable objects inherent in and encompassed by the invention will be more fully understood from the ensuing description and the annexed drawings, wherein:

Figure 2 is a diagrammatic view of a steering-by-driving transmission and an associated drive shaft for a propelling unit for the side of a vehicle, and illustrating the brake operators of Figure 1 in association with control brakes of the transmission and a brake for said shaft;

Figure 3 is a plan view of a crawler tractor wherein there is illustrated, in dotted lines, the manner in which steering-by-driving transmission apparatuses and control mechanism therefor constructed in accordance with the present invention are associated with the tractor.

Figure 1:
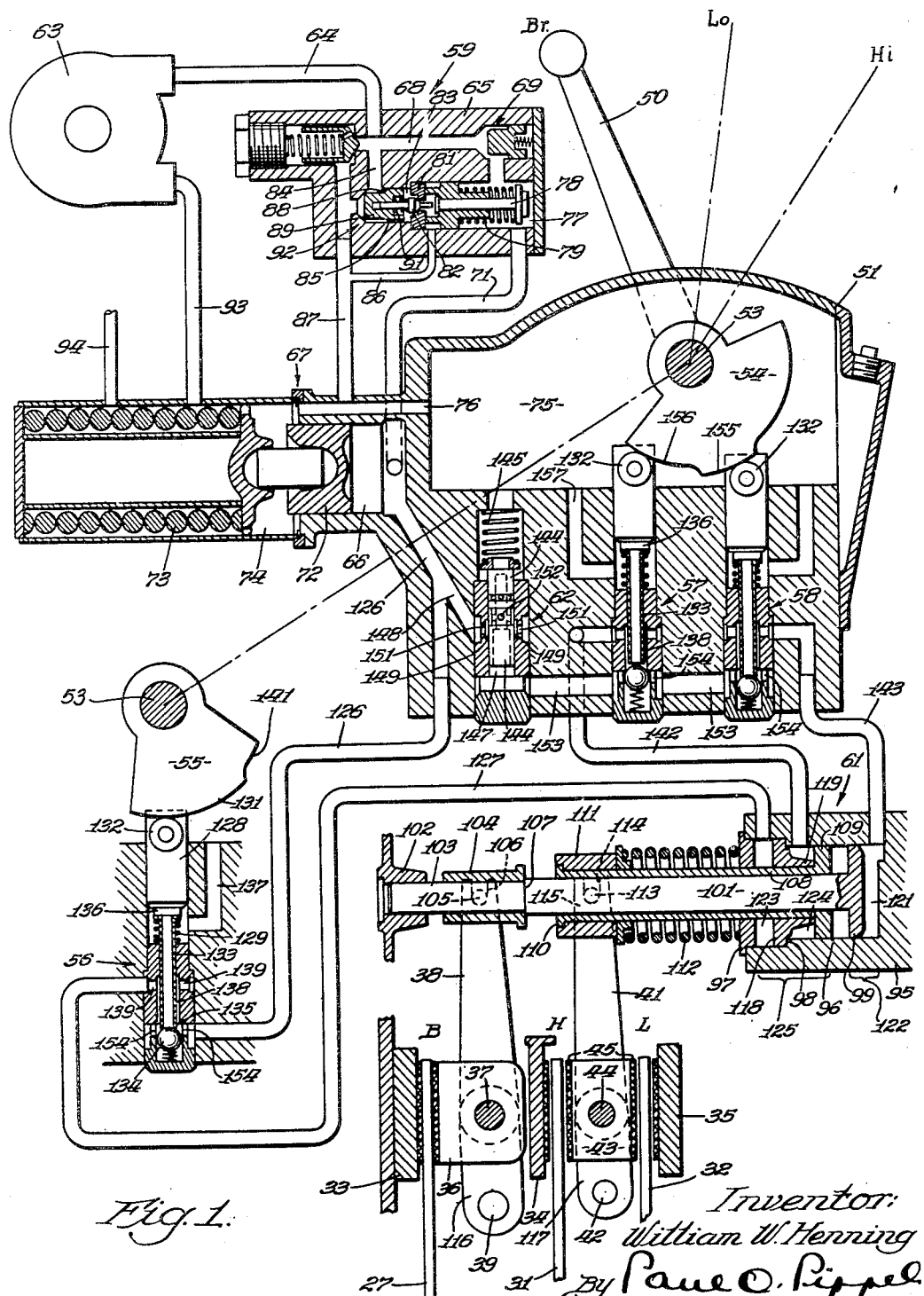
Figure 1 is a view, partly diagrammatic, of an apparatus embodying a preferred form of the invention and showing the operating relation between brake operators thereof and respectively associated brakes of a driving-to-steer transmission.

The invention is adapted for utilization with a crawler type vehicle, such as the crawler tractor of which a plan view is shown in Figure 3. This tractor has a body or frame 11 propelled by propelling units 12 in the form of endless tracks upon opposite sides of the body, and energy for driving the propelling units is obtained from an engine E mounted on a forward portion of the tractor body. The vehicle is caused to proceed in a straight course so long as the propelling units 12 are driven at the same speed and is steerable by causing the propelling units to rotate at different speeds.

Power is transmitted from the engine E to a bevel ring gear 13 in a final drive casing portion 14 of the tractor body through a conventional clutch and a conventional change-speed-gearing unit, neither of which are shown, and a bevel pinion 15. The bevel ring gear 13 is constrained for rotation with planetary gear carriers 16 and 16' at respective ends of such gear. These carriers 16 and 16' are parts of identical change-speed gearinng apparatuses 17 and 17'.

In the diagrammatic illustration of Figure 2, the transmission or change-speed gearing 17 can be seen to include axially spaced sun gears 18, 19 and 20 respectively meshed with planet gears 22, 23 and 24 which are constrained for rotation in unison and journaled within bearings 25 in the carrier 16. While only one of the gear clusters 22—23—24 is illustrated, there are in fact a plurality of these gear clusters spaced circumferentially about the gears 18, 19 and 20 in the manner well understood in the art of planetary gearing.

The sun gear 18 is constrained for rotation with a driven shaft 26 which is connected conventionally in driving relation with one of the vehicle propelling units 12 shown adjacently thereto in Figure 3. There is a brake disk 27 constrained for rotation with the shaft 26. Concentric transmission control shafts 28 and 29 are disposed about the shaft 26 and interconnect the sun gears 19 and 20 respectively with transmission brake disks 31 and 32.

Fixed pressure plates 33, 34 and 35 are respectively associated with the shaft brake disk 27 and the two transmission brake disks 31 and 32, as illustrated in Figures 1 and 2. These pressure plates 33, 34 and 35 are not complete annuluses for they extend only a limited distance circumferentially of the brake disks. A brake shoe 36 for cooperation with the fixed pressure plate 33 in gripping and braking the shaft disk 27 is pivotally mounted at 37 on a shaft brake operator 38 in the form of a lever mounted upon a fixed pivot 39 of which the axis extends transversely of the shaft 26. A transmission brake operator 41 in the form of a lever is mounted upon a fixed pivot 42 of which the axis also extends transversely of the shaft 26. An arcuate brake shoe 43 is pivotally mounted on the operator 41 by a pivotal connection 44. Facings 45 of friction material are on opposite sides of the brake shoe 43 for respective frictional engagement with the transmission brake disks 31 and 32 when the operator 41 is pivoted from the neutral position, illustrated in Figures 1 and 2, for cooperation with the fixed pressure plates 34 or 35.

It can be ascertained from an examination of the gearing in Figure 2 that movement of the brake arm lever 41 from the neutral position shown into position for engagement of the brake 31—34—45 will cause the sun gear 19 to be held against rotation so that during rotation of the bevel pinion 13 and the carrier 16, the gears 19, 23, 22 and 18 will be effective for imparting rotation to the shaft 26 at a reduced speed with respect to the bevel ring gear. It can also be ascertained that release of the brake 31—34—45 and engagement of the brake 32—35—45, by pivoting the operator 41 clockwise from the neutral position shown, will cause the sun gear 20 to be held stationary, wherefore rotation of the bevel ring gear and the carrier 16 will be effective through the gears 20, 24, 22 and 18 for rotating the shaft 26 at a greater reduced speed with respect to the bevel ring gear 13. Since the two transmission brakes 31—34—45 and 32—35—45 are adapted to condition the gearing 17 for driving the shaft 26 at relatively high and low speeds, the first of these brakes is designated H in Figure 1 to signify "High" speed, while the second of these brakes is designated L for signifying "Low" speed.

Pivoting of the brake operator 38 counterclockwise from the disengaged position illustrated in Figure 2 to the engaged position illustrated in Figure 1 simply engages the brake 27—33—36 for retarding or preventing rotation of the shaft 26. Since this last named brake operator is directly upon the shaft 26, it is referred to as a shaft brake and is designated by the single reference character B adjacently thereto in Figure 1. These three brakes are species of torque exerting devices energized, when engaged, to resist rotation of associated shafts by reactive torsional force.

The gearing within the unit 17', at the opposite side of the bevel ring gear 13, is controlled in the manner described with respect to the unit 17 by means of corresponding brake disks 31', 32', and 27' respectively corresponding to the brake disks 31, 32, and 27, wherefore the drive shaft 26' for the propelling means 12 at the right-hand side of the vehicle (lower as illustrated in Figure 3) is adapted to be controlled in speed and braking in the same manner as the shaft 26. Controls for the brake units 31', 32' and 27', identical with those illustrated in Figures 1 and 2 for the brake disks 31, 32 and 27, are also provided, making the structural arrangement symmetrical about the bevel ring gear 13. Corresponding parts on the two sides of the gear 13 are designated by the same reference characters in Figure 3, but with the addition of a prime to those reference characters associated with parts at the lower side of said gear.

Since it is possible to cause the two propelling means driving shafts 26 and 26' to rotate at different selective speeds or at zero speed, it is possible to cause the vehicle to proceed in a straight course or to turn upon arcs of selected radius in either direction from the straight course.

A hydraulic control system for the two gearing units 17 and 17' operates under control of two manually operated levers 50 and 50'. These levers project upwardly from a casing 51 through slots 52 and 52'. The levers are independently pivotable about a common rod 53, Figure 1. Lever 50 controls the gear unit 17, whereas lever 50' controls the gear unit 17'.

Referring now to the control lever 50 and the parts controlled thereby in Figure 1, this oscillatable lever has a pair of cam members 54 and 55 rockable therewith upon and about the rod 53 and which cam members are positionable in predetermined settings correlated with positions B, L, and H of the lever. When the manually operated lever 50 is in a "braking" position Br, it will cause the shaft brake B to be engaged and the transmission brakes H and L to be disengaged. When lever 50 is in a "Low" speed position Lo, the transmission brake L will be engaged and the other two brakes B and H disengaged; and when lever 50 is in a "High" speed position Hi, it will cause the transmission brake H to be engaged and the brakes B and L disengaged.

Cam 55 controls the opened and closed condition of a "High" hold-out valve 56, whereas the cam 54 controls the opened and closed positions of valves 57 and 58. These valves 56, 57 and 58 are connected in series with conduit means between a source of fluid pressure 59 and a variously energizeable means 61 in the form of hydraulic motor means having a plurality of chambers permutatively receivable of fluid under pressure for determining the position of the brake operators 38 and 41. A pressure reducing valve 62 disposed between the source 59 and the valves 57 and 58 enables these valves to cause fluid to be introduced into their respectively associated chambers of the hydraulic motor means at a pressure lower than the pressure adapted to be controlled by the valve 56 for its respective chamber of the hydraulic motor means.

The source of fluid pressure includes a constantly driven pump 63 which discharges fluid through a conduit 64 into a pressure controlling unit 65. After the pressure in a chamber 66 of a fluid accumulator 67 reaches a predetermined minimum, a valve 92 will be closed as shown and thereby cause fluid entering the unit 65 to flow through a channel 68 past a check valve 69 and through a conduit 71 into the accumulator chamber. Fluid entering the chamber 66 expands the same by displacing a plunger 72 to the left against the force of a spring 73 in a low pressure spring chamber 74. Chamber 74 is connected with a fluid reservoir 75 through a channel 76.

When the pressure in the accumulator chamber 66 attains a predetermined maximum, fluid at this same pressure in a valve chamber 77 will force a valve operating plunger 78 to the left against the force of an expansion spring 79 to open a valve 81 by unseating a member 82 of this valve, whereupon fluid in a passage 83 communicative with a passage 84 through a restricted flow passage 85, can escape past the valve 81 into the low pressure side of the system through conduits 86 and 87. The consequent reduction of pressure in the passage 83 allows the pressure of fluid against an annular end face 88 of a by-pass valve member 89 to force this member to the right against the relatively small resistance of a spring 91, and thereby open the by-pass valve 92. Fluid from the pump then escapes past the by-pass valve through the conduit 87 into the low pressure side of the system, and the concomitant pressure reduction in the passage 68 of the pressure controlling unit causes the check valve 69 to close so that fluid at high pressure in the accumulator chamber 66 cannot escape into the low pressure side of the system. Subsequent reduction of pressure in the accumulator chamber 66 to a value below a predetermined minimum will cause a corresponding pressure diminution upon the right-hand end of the valve operating plunger 78 so the spring 79 can return the plunger to the position illustrated in Figure 1, whereupon the spring 91 closes the valve 81. This causes fluid to be trapped in the passage 83 for closing the by-pass valve 92. Fluid is drawn to the inlet side of the pump 63 from the reservoir 75 through passage 66 and the spring chamber 74 and an inlet conduit 93. A breather conduit 94 for the low pressure side of the system may lead to a point of high elevation.

The hydraulic motor means 61 comprises a casing 95 containing a cylindrical bore 96 closed at its left-end by a cover plate 97 and having a shoulder 98 between sections of different diameter. A piston 99 in the small diameter portion of the bore 96 is upon the right-end of a piston rod 101 which has its left-end slidably supported within a casing bore 102. A reduced diameter portion 103 at the left-end of the rod 101 slidably carries a sleeve 104 having trunnion bearings 105 projecting diametrically oppositely therefrom and received by notches 106 in the upper ends of furcations of the brake operator 38. Sleeve 104 is shown abutted against a shoulder 107 at the right end of the reduced diameter portion of the piston rod.

A tubular piston rod 108 is arranged slidably and concentrically upon the piston rod 101 and has a piston 109 upon its right end. The left end of the tubular piston rod 108 has a flange 110 as a limiting stop for a collar 111 slidable axially upon this piston rod. An expansion spring 112 maintains the collar 111 against the stop 110 and, when unconstrained, is effective for pivoting the brake operator 41 into position for engaging the brake H. Connection of the collar 111 with the brake operator 41 is through trunnion bearings 113 projecting into notches 114 in the upper ends of furcations 115 on the upper end of the operator 41 and straddling said collar. Furcations 116 and 117 on the lower ends of the brake operators 38 and 41 straddle the brake shoes 36 and 43 and provide mounting means for opposite ends of pivot rods 37 and 44 for said brake shoes.

A floating piston 118 is reciprocable within the left-end of the casing bore 96. This piston has a small diameter extension 119 pressable against the piston 109 for displacing the same to the right, as viewed in Figure 1, an amount limited by the piston 118 reaching the shoulder 98 which serves as a stop limit therefor.

When fluid is introduced into the shaft brake chamber 121, the piston 99 and the rod 101 will be forced to the left for engaging the shaft brake B. This chamber 121 and piston 99 may therefore be regarded as components of a shaft brake hydraulic motor means 122.

Introduction of pressure fluid into a first transmission brake chamber 123 forces the floating piston 118 to the right into abutment with the piston 109 and thereby carries the pistons 118 and 109 to the right against the force of spring 112 a distance limited by abutment of the piston 118 with the stop 98. This moves the operator 41 into the neutral position shown in Figure 1 and thereby releases the transmission high-speed brake H. Introduction of pressure fluid into a second transmission brake chamber 124 forces the piston 109 to the right a greater distance than it was forced by the abutment of the floating piston 118 thereagainst, further compressing the spring 112 and pivoting the brake operator 41 sufficiently for engaging the low speed transmission brake L. Since fluid introduced into the chambers 123 and 124 is effective for operating the transmission brake operator 41 and thereby controlling the high and low speed brakes H and L of the gearing unit 17, these chambers may be regarded as first and second chambers of a transmission brake hydraulic motor means 125.

The high-speed holdout valve 56 is connected with the accumulator chamber 66 through a conduit 126 and when this valve is opened to permit communication of the conduit 126 therethrough, fluid at the pressure of the accumulator is forced into a conduit 127 which communicates with the transmission brake motor chamber 123. Valve 56 is shown open in Figure 1. In the opened condition of the valve, a plunger 128 thereof is forced downwardly against the force of a spring 129 by the action of a cam lobe 131 upon a roller 132 rotatably carried upon the plunger. A hollow stem 133 projecting from the lower end of the plunger 128, when forced downwardly by the plunger, causes its lower end to be closed by a valve ball 134 prior to the ball being displaced downwardly thereby from a valve seat 135. Since the ball 134 closes the lower end of the hollow stem 133, fluid from the conduit 126 cannot exhaust upwardly through the stem and outwardly through a passage 136 in the form of a groove extending diametrically across the valve stem head, and an exhaust passage 137 into the reservoir 75. Fluid from the conduit 126 can, however, at this time flow upwardly past the valve seat 135 through a passage 138 and ports 139 into the conduit 127.

Subsequent swinging of the cam 55 sufficiently for bringing a short radius profile portion 141 in registry with the roller 132 will permit the valve stem 133 to move upwardly under force of the spring 129. This permits the valve ball 134 to seat at 135 for preventing communication of the conduit 126 with the conduit 127. This upward movement of the hollow valve stem 133 is sufficient for displacing its lower end upwardly from the seated ball 134 so the pressure of fluid from the valve chamber 123 is relieved through the conduit 127, valve ports 139, valve passage 138, the hollow valve stem 133 and the passages 136 and 137 into the reservoir 75.

The construction of valves 56, 57 and 58 is identical, and the exhaust condition just described of the valve 56 is illustrated by the position of parts of valve 57 in Figure 1. A conduit 142 communicates between the valve 57 and the hydraulic motor chamber 124, whereas a conduit 143 communicates between the valve 58 and the shaft brake motor chamber 121.

The pressure reduction valve 62 comprises a plunger 144 urged downwardly by a spring 145. When there is no pressure or a low pressure below the plunger 144 in the casing bore 147 therefor, the plunger 144 is forced downwardly into some such position as that illustrated. Pressure of fluid from a passage 148 entering an annular chamber 149 through ports 151 can then flow through holes 152 in the hollow plunger 144 and outwardly through its open lower end into the valve casing bore 147.

The lower end of the casing bore 147 is communicative through a passage 153 with inlet ports 154 of the valves 57 and 58 which are identical with the inlet ports 154 of the valve 56. When the pressure in the lower end of the valve casing bore 147 increases to an amount predeterminedly less than in the pressure passage 148 and determined by the force of spring 145, the fluid in the bore 147 will be effective for moving the plunger 144 upwardly far enough to dispose the large diameter end portion of said plunger in bridging relation across the annular passage 149 to terminate communication between the ports 151 and 152, and thereby terminate communication between the passages 148 and 153. In this manner the pressure reducing unit 62 is effective to maintain a lower pressure in the passage 153 than in the passage 158.

*Operation*

With the manually operated control lever in the "braking" position Br, illustrated in Figure 1, a lobe 155 on the cam 54 is disposed in registry with the roller 132 of the valve 58 for opening this valve, and concurrently the lobe 131 on the cam 55 is similarly operable for opening the "high" hold-out valve 56. The short radius profile portion 156 of the cam 54 registers with the roller 132 of the valve 57, whereby this valve is placed in the condition of exhaust so that the pressure of any fluid in the transmission brake chamber 124 is relieved through the conduit 143, passage 138 of said valve 57, the lower open end of the hollow valve stem 133, transverse passage 136 at the upper end of said valve stem, and an exhaust passage 157 into the reservoir 75.

Fluid at the pressure within the accumulator chamber 66 is impressed through the conduit 126, ports 154 of the open valve 56 past the valve seat 135, passage 138, ports 139 and a conduit 127 into the first transmission brake chamber 123, whereby the floating piston 118 is moved to the right against the stop 98 incident to moving the piston 109 to the right against the force of the spring 112, and thereby pivoting the brake operator 41 for disengaging the "high" speed brake H. Fluid at reduced pressure in the passage 153, after having passed through the pressure reduction unit 62, flows through the open valve 58 in the manner described with respect to the valve 56, and thence through the passage 143 into the shaft brake chamber 121 for moving the piston rod 101 and the upper end of the brake operator 38 to the left for engaging the shaft brake B. Thus while the control member 40 is in the "braking" position, the shaft brake B will be engaged and the high speed transmission brake H and the "low" speed transmission brake L will be disengaged, as illustrated in Figure 1.

Movement of the control member 40 from position B to the "low" position Lo will move the cam lobe out of operative registry with the roller 132 of the valve 58 into operative registry with the roller 132 of the valve 57. As a consequence, the valve 58 will be allowed to assume its exhaust position for exhausting the shaft brake chamber 121 and thereby releasing the shaft brake B, while the valve 57 is opened for introducing fluid into the second transmission brake chamber 124 for moving the piston 109 to the right, further compressing the spring 112 and manipulating the brake operator 41 for engaging the "low" speed brake L. Meanwhile the cam lobe 131 will have remained in operative registry with the roller 132 of the "high" hold-out valve 56 so that this valve remains open and fluid at the pressure of the accumulator 66 remains in the first transmission brake chamber 123, maintaining the floating piston 118 against the stop shoulder 98. Under these circumstances the shaft brake B and the "high" speed transmission brake H will be disengaged and the "low" speed transmission brake L will be engaged for connecting the gearing of the unit 17 for low speed operation.

Further clockwise advancement of the control lever 40 into the "high" position H will displace the cam lobe 155 to the left of the roller 132 on the valve 57, whereby both of the valves 57 and 58 will be allowed to exhaust. The dwell or short radius profile portion 141 of cam 55 is carried into registry with the roller 132 of the "high" hold-out valve 156, whereby this valve is also allowed to exhaust. Consequently, each of the hydraulic motor chambers 123, 124, and 121 is communicative with the exhaust wherefore the shaft brake B remains disengaged and the spring 112 is effective for pivoting the brake operator 41 for engaging the "high" speed transmission brake H, and thereby conditioning the gearing in the unit 17 for rotating the propelling unit drive shaft 26 at the higher of the two reduced speeds at which the gearing is adapted to drive said shaft.

Disposal of the pressure reducing unit 62 in series between the accumulator chamber 66 and the hydraulic motor chambers 121 and 124 while providing for a direct communication between the accumulator and the hydraulic motor chamber 123, assures against diversion of fluid from the conduit 126 at such a rate as to diminish the pressure in the hydraulic motor chamber 123 to a value at which the "high" brake H might be allowed to become engaged by the force of the spring 112 concurrently with engagement of the shaft brake B. The assurance afforded by imposing the greater pressure into the brake chamber 123 is augmented by the throttling effect of the pressure reducing unit 62 limiting the rate at which fluid can be diverted through the passage 148 into the hydraulic motor chambers 121 and 124.

Employment of disk brakes and brake operators 38 and 41 arranged to swing about the parallel axes adapts these brake operators to be controlled by a simplified type of hydraulic motor utilizing the telescopic piston rods and a single bore within a motor cylinder or casing.

The arrangement has a further advantage of employing the spring 112 for holding the "high" speed brake H engaged in the event the hydraulic pressure system should fail. With this arrangement, failure of the hydraulic system would bring about the condition of both the gearing units 17 and 17' being connected in "high" speed, so the vehicle would normally follow a straight course. Departure from this straight course an amount sufficient to enable an operator to steer the vehicle to a repair shop is then possible by manual application of braking force by means of brake shoes, not shown, to the shaft brake disks 27.

Having thus described a single preferred form of the invention with the view of clearly and concisely illustrating the same, I claim:

1. For use in the control of vehicle steering-by-driving apparatus including a driven shaft drivingly connected with propelling means at a side of the vehicle, a brake for said shaft, change-speed gearing drivingly connected with said shaft, and "High" and "Low" speed transmission brakes operable when individually engaged to condition the transmission for rotating the shaft at relatively high and low speeds: the combination of a shaft brake operator forcible into an engaging position for engaging the shaft brake, a transmission brake operator forcible successively from a "High" position wherein the "High" speed transmission brake is engaged to a "Neutral" position wherein neither transmission brake is engaged and to a "Low" position for engaging the "Low" speed brake, means biasing the transmission brake operator toward its "High" position and operable to place the same in such position when such operator is released, means variously energizable to cause disposition of the brake operators in permutations of said positions respectively correlated with the energizations of such variously energizable means, and control means for said energizable means, said control means including a control member settable in and movable selectively between "Braking" and "High" positions incident to traversing an in-between "Low" position at which such member is also settable, said energizable means being conditioned by setting of the control member in the "Braking" position to cause disposition of the shaft brake operator in its engaging position and the transmission brake operator in its "Neutral" position, said energizable means being conditioned by setting of the control member in its "Low" position to cause release of the shaft brake from its brake engaging position and disposition of the transmission brake operator in its "Low" position, and said energizable means being conditioned by setting of the control member in its "High" position to cause release of both brake operators.

2. For use in the control of vehicle steering-by-driving apparatus including a driven shaft drivingly connected with propelling means at a side of the vehicle, a brake for said shaft, change-speed gearing drivingly connected with said shaft, and "High" and "Low" speed transmission brakes operable when individually engaged to condition the transmission for rotating the shaft at relatively high and low speeds: the combination of a shaft brake operator placeable into an engaging position for engaging the shaft brake or into a "Releasing" position for releasing such brake, a transmission brake operator movable successively from a "High" position wherein the "High" speed transmission brake is engaged to a "Neutral" position wherein neither transmission brake is engaged and to a "Low" position wherein the "Low" speed brake is engaged, means variously energizable to cause disposition of the brake operators in permutations of said positions respectively correlated with the energizations of such variously energizable means, and control means for said energizable means, said control means including a control member settable in and movable selectively between "Braking" and "High" positions incident to traversing an in-between "Low" position at which such member is also settable, said energizable means being conditioned by setting of the control member in the "Braking" position to cause disposition of the shaft brake operator in its brake engaging position and the transmission brake operator in its "Neutral" position, said energizable means being conditioned by setting of the control member in its "Low" position to cause disposition of the shaft brake operator in its "Releasing" position and disposition of the transmission brake operator in its "Low" position, and said energizing means being conditioned by setting of the control member in its "High" position to cause coexisting disposition of the shaft brake operator in its "Releasing" position and disposition of the transmission brake in its "High" position.

3. In mechanism utilizing fluid from a pressure source in the control of vehicle steering-by-driving apparatus including a driven shaft drivingly connected with propelling means at a side of the vehicle, a brake for said shaft, change-speed gearing drivingly connected with said shaft, and "High" and "Low" speed transmission brakes operable when individually engaged to condition the transmission for rotating the shaft at relatively high and low speeds: the combination of a shaft brake operator placeable into an engaging position for engaging the shaft brake or into a "Releasing" position for releasing such brake, a transmission brake operator movable successively from a "High" position wherein the "High" speed transmission brake is engaged to a "Neutral" position wherein neither transmission brake is engaged and to a "Low" position wherein the "Low" speed brake is engaged, hydraulic motor means including a shaft brake hydraulic motor operably connected with the shaft brake operator and including a chamber receivable of pressure fluid to cause disposition of the shaft brake operator in its brake engaging position, said hydraulic motor means also including a transmission brake hydraulic motor operably connected with the transmission brake operator and including a first chamber receivable of pressure fluid to cause disposition of such operator in its "Neutral" position and a second chamber receivable of pressure fluid to cause disposition of such operator in the "Low" position, said hydraulic motor means being conditioned for disposition of the transmission brake operator in the "High" position when neither of the first and second chambers is subjected to fluid pressure, control valve means, conduit means selectively communicatable between said pressure fluid source and said chambers under control of said valve means, and a valve control member settable in and manipulatable between "Breaking" and "High" positions incident to traversing an in-between "Low" position wherein it is also settable, said control member being operable when set in the "Braking" position to establish communication of the shaft brake motor chamber and said first chamber of the transmission brake motor with said source, said control member being operable when in the "Low" position to establish communication between the source and the second chamber of the transmission brake motor, and said member being operable when in the "High" position to terminate communication between the source and each of the motor chambers.

4. In mechanism utilizing fluid from a pressure source in the control of vehicle steering-by-driving apparatus including a driven shaft drivingly connected with propelling means at a side of the vehicle, a brake for said shaft, change-speed gearing drivingly connected with said shaft, and "High" and "Low" speed transmission brakes operable when individually engaged to condition the transmission for rotating the shaft at relatively high and low speeds: the combination of a shaft brake operator placeable into an engaging position for engaging the shaft brake or into a "Releasing" position for releasing such brake, a transmission brake operator movable successively from a "High" position wherein the "High" speed transmission brake is engaged to a "Neutral" position wherein neither transmission brake is engaged and to a "Low" position wherein the "Low" speed brake is engaged, hydraulic motor means operably connected with said operators and including a shaft brake chamber effective when communicative with said source to cause disposition of the shaft brake operator in its brake engaging position, said hydraulic means also including transmission brake chambers of which a first is effective when communicative with said source to cause disposition of the transmission brake operator in its "Neutral" position and of which chambers a second is effective when communicative with said source to cause disposition of the transmission brake operator in its "Low" position, means for disposing the transmission brake operator in the "High" position when neither of the first and second chambers is subjected to fluid pressure, control valve means, conduit means selectively communicatable between said pressure fluid source and said chambers under control of said valve means, and a valve control member settable in and manipulatable between "Braking" and "High" positions incident to traversing an in-between "Low" position wherein it is also settable, said control member being operable when set in the "Braking" position to establish communication of the shaft brake chamber and the first transmission brake chamber with said source, said control member being operable when in the "Low" position to establish communication between the source and the second transmission brake chamber, and said member being operable when in the "High" position to terminate communication between the source and each of the motor means chambers.

5. In mechanism utilizing fluid from a pressure source in the control of vehicle steering-by-driving apparatus including a driven shaft drivingly connected with propelling means at a side of the vehicle, a brake for said shaft, change-speed gearing drivingly connected with said shaft, and a transmission brake operable when engaged to condition the gearing for rotating said shaft: the combination of means urging the transmission brake engaged, hydraulic motor means for operating said brakes and including a shaft brake chamber effective when communicative with said source to energize the motor means for applying the shaft brake, said motor means also including a transmission brake chamber effective when communicative with the source to energize the motor means for releasing the transmission brake, valves communicative respectively between said chambers and the source, and a control member settable selectively between a position wherein both of said valves establish communication between their associated chambers and said source and a position wherein neither valve establishes such communication and the pressure in said chambers is dissipated.

6. The combination set forth in claim 5, wherein there is a fluid pressure reduction unit interposed between the source and the shaft brake chamber of the motor means to cause less pressure to be attained in this chamber than in the transmission brake chamber.

7. The combination set forth in claim 5, wherein the communication between the source and the shaft brake chamber has appreciatively greater resistance to the flow of fluid from the source than has the communication between the source and the transmission brake chamber.

8. In mechanism utilizing fluid from a pressure source in the control of vehicle steering-by-driving apparatus including a driven shaft drivingly connected with propelling means at a side of the vehicle, a brake for said shaft, change-speed gearing drivingly connected with said shaft, and "High" and "Low" speed transmission brakes operable when individually engaged to condition the transmission for rotating the shaft at relatively high and low speeds: the combination of motor means for operating said brakes and including a shaft brake chamber effective when communicative with the source to energize the motor means for applying the shaft brake, said motor means also including first and second transmission brake chambers respectively effective when communicative with the source to energize the motor means for release of both transmission brakes and to energize the motor means for release of the "High" speed brake and for engagement of the "Low" speed brake, valves respectively communicative between said chambers and the source, a valve control member settable in a "Braking" position to open the valves for the shaft brake chamber and the first transmission brake chamber but not the valve for the second transmission brake chamber, said control member being settable in a "Low" position to open the valve for the second transmission brake chamber but not for the shaft brake chamber, said control member also being settable in a "High" position to close all of said valves for preventing communication between the source and any of said chambers, and means for engaging the "High" speed brake when the control member is in such "High" position.

9. The combination set forth in claim 8, wherein there is a fluid pressure reduction unit between the source and each of said shaft brake and second transmission brake chambers to cause less pressure to be attained in these chambers than in the first transmission brake chamber.

10. The combination set forth in claim 8, wherein the communication between the source and the first transmission brake chamber has less resistance to the flow of fluid from the source than has each of the communications from the source to the other two chambers.

11. In mechanism utilizing fluid from a pressure source in the control of vehicle steering-by-driving apparatus including a driven shaft drivingly connected with propelling means at a side of the vehicle, a brake for said shaft, change-speed gearing drivingly connected with said shaft, and a transmission brake operable when engaged to condition the transmission for rotating said shaft: the combination of a hydraulic motor means for operating said brakes, said motor means including a cylinder having a piston rod end, concentric relatively axially movable piston rods projecting outwardly through the piston rod end of the cylinder, the inner of said rods being operably connected with the shaft brake and operable to engage such brake when forcibly moved in one axial direction, said cylinder containing a shaft brake chamber receivable of fluid pressure from said source to so move said piston rod, the outer of said piston rods being operably connected with the transmission brake, piston means on the outer of said rods and subjectable to the pressure of fluid in a transmission brake chamber in the cylinder to move the outer rod in an axial direction for holding the transmission brake disengaged, spring means urging the outer rod in the opposite direction to engage the transmission brake, valves communicative respectively between said chambers and the source, and a control member settable selectively between a position wherein both of said valves establish communication between their associated chambers and a position wherein neither valve establishes such communication and the pressure in said chambers is dissipated.

12. The combination set forth in claim 11 wherein a fluid pressure reduction unit is disposed between the source and shaft brake chamber of the motor means to assure sufficient pressure in the transmission brake chamber for holding the transmission brake released during engagement of the shaft brake.

13. In mechanism utilizing fluid from a pressure source in the control of vehicle steering-by-driving apparatus including a driven shaft drivingly connected with propelling means at a side of the vehicle, a brake for said shaft, change-speed gearing drivingly connected with said shaft, and "High" and "Low" speed transmission brakes operable when individually engaged to condition the transmission for rotating the shaft at relatively high and low speeds: the combination of hydraulic motor means for operating said brakes, said motor means including a cylinder having a piston rod end, concentric relatively axially movable piston rods projecting outwardly through the piston rod end of the cylinder, the inner of said rods being operably connected with the shaft brake and operable to engage such brake when forcibly moved axially outwardly of the piston rod end of the cylinder, the cylinder containing a shaft brake chamber wherein fluid is effective to so move said inner piston rod when the chamber is communicative with said source, the outer of said piston rods being operably connected with the transmission brakes, spring means urging the outer rod outwardly of the cylinder into an outward position causing engagement of the "High" brake, piston means on said outer rod and comprising components of which one has limited sliding movement on the outer rod, the cylinder containing a first transmission brake chamber wherein fluid is effective when the chamber is communicative with the source to force the sliding piston means component inwardly from the piston rod end of the cylinder to the limit of movement relatively to its rod so that continued inward movement of said component forces the outer rod inwardly against the force of the spring incident to disengaging the "High" brake, stop means preventing further inward movement of the slidable piston component after release of the "High" brake, and the cylinder containing a second transmission brake chamber wherein fluid is operable to move the other piston means component and the outer piston rod further into the cylinder to engage the "Low" brake when this second transmission brake chamber is communicative with said source; valves communicative respectively between said chambers and the source; and a valve control member settable selectively between a braking position wherein communication of the source is concurrently established with the shaft brake chamber and the first transmission brake chamber while the second transmission brake chamber is exhausted, a "Low" position wherein communication is established between the source and the second transmission brake chamber while at least the shaft brake chamber is exhausted, and a "High" position wherein each of said chambers is exhausted.

14. The combination set forth in claim 13, wherein the valve for the first transmission brake chamber is connected directly between the source and said chamber, and wherein pressure reducing means is interposed in series with each of the communications established by the other two valves between the source and the other two chambers.

15. The combination set forth in claim 13, wherein the communication established by the valve associated with the first transmission brake chamber between said chamber and source has an appreciably greater flow capacity than the communications established between the source and each of the other two chambers by the other of said valves.

16. In a mechanism utilizing fluid from a pressure source in the control of vehicle steering-by-driving apparatus including a driven shaft drivingly connected with propelling means at a side of the vehicle, a shaft brake disk constrained for rotation with said shaft, and "High" and "Low" speed transmission brake disks spaced axially apart in coaxial relation with said brake shaft disk and at one side of the brake shaft disk with the high disk in between the other two disks: the combination of a stationary pressure plate adjacently to the side of the shaft brake disk disposed oppositely from the high speed transmission brake disk, a second stationary pressure plate adjacently to the side of the high speed disk facing the shaft brake disk, a third fixed pressure plate adjacently to the side of the low-speed brake disk disposed oppositely from the high-speed brake disk, a shaft brake operator pivotable about a fixed axis directed transversely of the brake disk axes and disposed between the shaft brake disk and the high-speed brake disk, a movable pressure plate carried by said operator and forcible to grip the shaft brake disk therebetween and the first stationary pressure plate when said operator is pivotally advanced, a transmission brake operator pivotable about a fixed axis directed transversely to the axes of the brake disks and disposed between the high-speed and the low-speed brake disks, a double sided pressure plate mounted on the transmission brake operator, the last named pressure plate being out of contact with each of the transmission brake disks when the transmission brake operator is in a neutral position but being cooperable with the second fixed pressure plate when the operator is pivoted into a high position and cooperable with the third fixed pressure plate for gripping the low transmission brake disk when the operator is pivoted in the opposite direction from neutral into a low position; hydraulic motor means for operating said brake operators, said motor means including a cylinder having a piston rod end, concentric relatively axially movable piston rods projecting outwardly through the piston rod end of said cylinder, the inner of said rods being operably connected with the shaft brake operator and operable to advance such operator into brake engaging position when forcibly moved axially outwardly of the piston rod end of a cylinder, the cylinder containing a shaft brake chamber wherein fluid is effective to so move said piston rod when the chamber is communicative with said source, the outer of said piston rods being operably connected with the transmission brake operator and operable to pivot said operator into the high brake engaging position when projected outwardly of the piston rod end of the cylinder, spring means urging said outer rod outwardly of the cylinder with a force sufficient to engage the high brake, piston means on said outer brake rod and comprising components of which one has a limited sliding movement on the outer rod, the cylinder containing a first transmission brake chamber wherein fluid is effective when the chamber is communicative with said source to force the sliding component inwardly from the piston rod cylinder to the limited movement relatively to its rod so that continued inward movement of said component forces the outer rod inwardly against the force of said spring incident to establishing the neutral position of the high brake operator, stop means preventing further inward movement of the slidable piston component incident to the attainment of the neutral position, and the cylinder containing a second transmission brake chamber wherein the fluid is operable to move the other piston means component and the outer piston rod further into the cylinder for placing the transmission brake operator in the low brake engaging position when the second transmission brake chamber is in communication with said source; valves communicative respectively between said chambers and the source; and a valve control member settable selectively between a braking position wherein communication of the source is concurrently established with the shaft brake chamber and the first transmission brake chamber while the second transmission brake chamber is exhausted, a "Low" position wherein communication is established between the source and the second transmission brake chamber while at least the shaft brake chamber is exhausted, and a "High" position wherein each of said chambers is exhausted.

WILLIAM W. HENNING.

REFERENCES CITED

The following references are of record in the file of this patent:

UNITED STATES PATENTS

| Number | Name | Date |
| --- | --- | --- |
| 1,423,941 | Jett | July 25, 1922 |
| 2,392,729 | Edge | Jan. 8, 1946 |